US009287045B2

(12) United States Patent
Yoon et al.

(10) Patent No.: US 9,287,045 B2
(45) Date of Patent: Mar. 15, 2016

(54) DIELECTRIC CERAMIC COMPOSITION AND MULTILAYER CERAMIC CAPACITOR INCLUDING THE SAME

(71) Applicants: SAMSUNG ELECTRO-MECHANICS CO., LTD., Suwon, Gyunggi-do (KR); RESEARCH & BUSINESS FOUNDATION SUNGKYUNKWAN UNIVERSITY, Suwon, Gyunggi-do (KR)

(72) Inventors: Seok Hyun Yoon, Gyunggi-do (KR); Dae Ho Yoon, Gyunggi-do (KR); Suk Hyun Song, Gyunggi-do (KR); Takaki Masaki, Gyunggi-do (KR); Doo Young Kim, Gyunggi-do (KR); Sang Huk Kim, Gyunggi-do (KR); Jong Bong Lim, Gyunggi-do (KR)

(73) Assignees: SAMSUNG ELECTRO-MECHANICS CO., LTD., Suwon, Gyunggi-Do (KR); RESEARCH & BUSINESS FOUNDATION SUNGKYUNKWAN UNIVERSITY, Suwon, Gyunggi-Do (KR)

( * ) Notice: Subject to any disclaimer, the term of this patent is extended or adjusted under 35 U.S.C. 154(b) by 140 days.

(21) Appl. No.: 14/095,634

(22) Filed: Dec. 3, 2013

(65) Prior Publication Data
US 2015/0062774 A1 Mar. 5, 2015

(30) Foreign Application Priority Data
Sep. 5, 2013 (KR) .................. 10-2013-0106682

(51) Int. Cl.
 H01G 4/06 (2006.01)
 H01G 4/12 (2006.01)
 H01G 4/30 (2006.01)

(52) U.S. Cl.
 CPC .............. *H01G 4/1227* (2013.01); *H01G 4/30* (2013.01)

(58) Field of Classification Search
 CPC ....................................................... H01G 4/12
 USPC ..................... 501/137–139; 361/321.1–321.5
 See application file for complete search history.

(56) References Cited

U.S. PATENT DOCUMENTS 4,228,482 A * 10/1980 Bouchard et al. ............ 501/136
7,697,263 B2 * 4/2010 Bridger et al. ............... 361/311

FOREIGN PATENT DOCUMENTS

JP 2011-173776 A 9/2011
KR 1999-0075846 A 3/1998

OTHER PUBLICATIONS

N. M. Olekhnovich et al, Impedance Spectroscopy of Dielectric Properties of Perovskite Ceramics Bi(Mg1/2Ti1/2)O3, 2009, Physics of Solid State, vol. 51, No. 3, pp. 582-588.*

*Primary Examiner* — Eric Thomas
(74) *Attorney, Agent, or Firm* — McDermott Will & Emery LLP

(57) ABSTRACT

There are provided a dielectric ceramic composition and a multilayer ceramic capacitor including the same. The dielectric ceramic composition according to embodiments of the present disclosure includes a base powder represented by $xSrTiO_3$-$(1-x)BiMO_3$ (M includes Mg and Ti) containing a first main component represented by $SrTiO_3$ and a second main component represented by $BiMO_3$, wherein x satisfies $0.5 \leq x \leq 0.9$.

15 Claims, 2 Drawing Sheets

A-A'

DIELECTRIC CERAMIC COMPOSITION AND MULTILAYER CERAMIC CAPACITOR INCLUDING THE SAME

CROSS-REFERENCE TO RELATED APPLICATION

This application claims the benefit of Korean Patent Application No. 10-2013-0106682 filed on Sep. 5, 2013, with the Korean Intellectual Property Office, the disclosure of which is incorporated herein by reference.

BACKGROUND

The present disclosure relates to a high permittivity dielectric ceramic composition having no change in permittivity when a direct current (DC) electric field is applied thereto, and a multilayer ceramic capacitor including the same.

Generally, an electronic component using a ceramic material, such as a capacitor, an inductor, a piezoelectric element, a varistor, a thermistor, or the like, includes a ceramic body formed of a ceramic material, internal electrodes formed in the ceramic body, and external electrodes mounted on a surface of the ceramic body and connected to the internal electrodes.

Among ceramic electronic components, a multilayer ceramic capacitor includes a plurality of laminated dielectric layers, internal electrodes disposed to face each other, having one dielectric layer interposed therebetween, and external electrodes electrically connected to the internal electrodes.

The multilayer ceramic capacitors have been widely used as components for mobile communications devices such as computers, PDAs, mobile phones, and the like, due to advantages thereof such as miniaturization, high capacitance, easiness of mounting, or the like.

The multilayer ceramic capacitor is generally manufactured by forming sheets using a paste for dielectric layers and a paste for internal electrodes by a printing method or the like, laminating and simultaneously sintering the same.

A dielectric material used in a high capacitance multilayer ceramic capacitor according to the related art, a ferroelectric material based on barium titanate ($BaTiO_3$), has high permittivity at room temperature, a relatively low dissipation factor, and excellent insulation resistance properties.

However, in the case in which the ferroelectric material is used, the ferroelectric material has a reduction of permittivity as the size of particles is reduced, exhibit aging characteristics in which permittivity is reduced over time, and has a reduction of permittivity when a direct current (DC) electric field is applied thereto.

In addition, when the ferroelectric material is sintered in a reducing atmosphere, dielectric layers may be reduced to thereby be semi-conducting or have low insulation resistance (IR).

Since a multilayer ceramic capacitor in a circuit of a device is mainly used with DC voltage applied thereto, a method of implementing high capacitance even in a DC electric field is required.

In accordance with the development of a high capacitance multilayer ceramic capacitor, a thickness of the dielectric layer is gradually reduced and a magnitude of applied DC electric field per unit thickness is gradually increased.

Therefore, there is an attempt to use a paraelectric material having no change in permittivity when a DC electric field is gradually increased.

As compared to the ferroelectric material, the paraelectric material has no change in permittivity depending on the size of particles, does not exhibit the aging characteristics in which permittivity is reduced over time, and has no change in permittivity when a direct current (DC) electric field is applied.

However, the paraelectric material has lower permittivity than the ferroelectric material, so that there is a limitation in the application thereof.

Therefore, in order to implement high capacitance in the DC electric field, there is required a material having high permittivity among the paraelectric materials having no change in permittivity in the case in which the DC electric field is applied.

RELATED ART DOCUMENT (Patent Document 1) Korean Patent Laid-Open Publication No. 1999-0075846

SUMMARY

An aspect of the present disclosure provides a high permittivity dielectric ceramic composition having no change in permittivity when a direct current (DC) electric field is applied, and a multilayer ceramic capacitor including the same.

According to an aspect of the present disclosure, a dielectric ceramic composition may include a base powder represented by $xSrTiO_3$-$(1-x)BiMO_3$ (M includes Mg and Ti) containing a first main component represented by $SrTiO_3$ and a second main component represented by $BiMO_3$, wherein x satisfies $0.5 \leq x \leq 0.9$.

M may be represented by $Mg_{0.5}Ti_{0.5}$.

The dielectric ceramic composition may further include a first sub-component of 0.5 mol to 3.0 mol, based on the base powder of 100 mol, the first sub-component being an oxide or a carbonate containing at least one of Mn, V, Cr, Fe, Ni, Co, Cu and Zn.

The dielectric ceramic composition may further include a second sub-component of 0.5 mol to 3.0 mol, based on the base powder of 100 mol, the second sub-component being an oxide containing Si or a glass compound containing Si.

The dielectric ceramic composition may have a permittivity of 1000 or more at room temperature.

According to another aspect of the present disclosure, a multilayer ceramic capacitor may include: a ceramic body in which dielectric layers and first and second internal electrodes are alternately stacked; and first and second external electrodes formed on both end portions of the ceramic body and electrically connected to the first and second internal electrodes, wherein the dielectric layers may include a dielectric ceramic composition including a base powder represented by $xSrTiO_3$-$(1-x)BiMO_3$ (M includes Mg and Ti) containing a first main component represented by $SrTiO_3$ and a second main component represented by $BiMO_3$, and x may satisfy $0.5 \leq x \leq 0.9$.

M may be represented by $Mg_{0.5}Ti_{0.5}$.

The dielectric ceramic composition may further include a first sub-component of 0.5 mol to 3.0 mol, based on the base powder of 100 mol, the first sub-component being an oxide or a carbonate containing at least one of Mn, V, Cr, Fe, Ni, Co, Cu and Zn.

The dielectric ceramic composition may further include a second sub-component of 0.5 mol to 3.0 mol, based on the base powder of 100 mol, the second sub-component being an oxide containing Si or a glass compound containing Si.

The dielectric ceramic composition may have a permittivity of 1000 or more at room temperature.

According to another aspect of the present disclosure, a multilayer ceramic capacitor may include: a ceramic body in which dielectric layers and first and second internal electrodes are alternately stacked; and first and second external electrodes formed on both end portions of the ceramic body and electrically connected to the first and second internal electrodes, wherein the dielectric layers may include a dielectric ceramic composition having a permittivity of 1000 or more at room temperature and satisfying a rate of change in dielectric constant ($\in_r$) of 10% or less when a DC electric field is changed from 0V to 5 V/μm.

The dielectric ceramic composition may include a base powder represented by $xSrTiO_3$-$(1-x)BiMO_3$ (M includes Mg and Ti) containing a first main component represented by $SrTiO_3$ and a second main component represented by $BiMO_3$, and x may satisfy $0.5 \leq x \leq 0.9$.

M may be represented by $Mg_{0.5}Ti_{0.5}$.

The dielectric ceramic composition may further include a first sub-component of 0.5 mol to 3.0 mol, based on the base powder of 100 mol, the first sub-component being an oxide or a carbonate containing at least one of Mn, V, Cr, Fe, Ni, Co, Cu and Zn.

The dielectric ceramic composition may further include a second sub-component of 0.5 mol to 3.0 mol, based on the base powder of 100 mol, the second sub-component being an oxide containing Si or a glass compound containing Si.

The first and second internal electrodes may include palladium (Pd) or a palladium (Pd) alloy.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
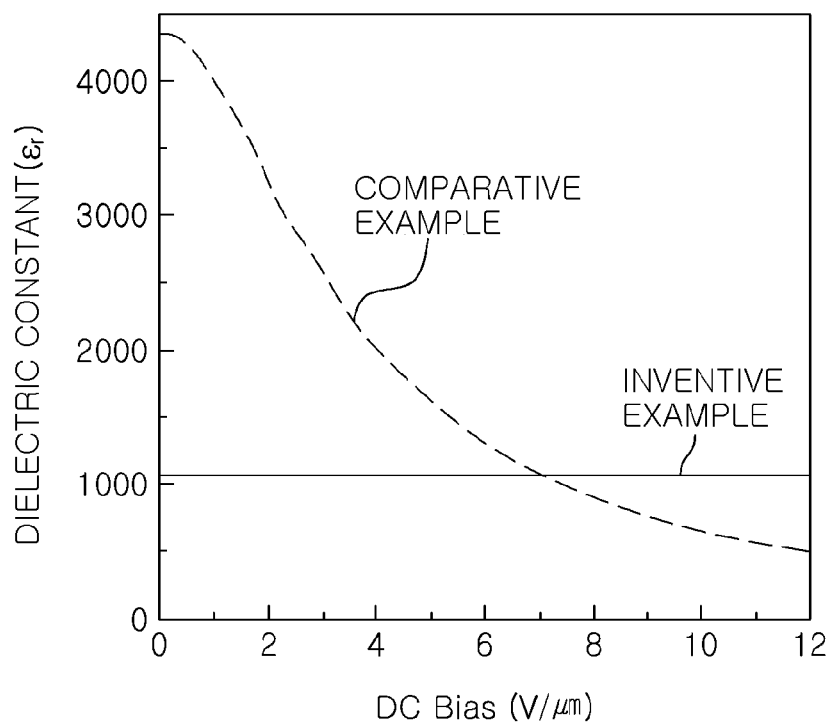
FIG. 1 is a graph showing changes in dielectric constant ($\in_r$) against a direct current (DC)-bias according to an inventive example and a comparative example.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

The present disclosure relates to a dielectric ceramic composition. Examples of electronic components including a dielectric ceramic composition according to exemplary embodiments of the present disclosure include a capacitor, an inductor, a piezoelectric element, a varistor, a thermistor, and the like. Hereinafter, a dielectric ceramic composition and a multilayer ceramic capacitor including the same as an example of electronic components will be described.

A dielectric ceramic composition according to an embodiment of the present disclosure may include a base powder represented by $xSrTiO_3$-$(1-x)BiMO_3$ (M includes Mg and Ti) containing a first main component represented by $SrTiO_3$ and a second main component represented by $BiMO_3$, where x satisfies $0.5 \leq x \leq 0.9$.

The dielectric ceramic composition according to the embodiment of the present disclosure may secure high permittivity of 1000 or more at room temperature.

In addition, a multilayer ceramic capacitor using the dielectric ceramic composition according to the embodiment of the present disclosure is superior in terms of DC-bias characteristics, that is, has no change in permittivity when a DC electric field is applied, whereby high capacitance may be implemented without a reduction of capacitance.

Hereinafter, respective components of a dielectric ceramic composition according to an embodiment of the present disclosure will be described in detail.

a) Base Powder

The dielectric ceramic composition according to the embodiment of the present disclosure may include a base powder represented by $xSrTiO_3$-$(1-x)BiMO_3$ (M includes Mg and Ti) containing a first main component represented by $SrTiO_3$ and a second main component represented by $BiMO_3$.

In the above chemical formula, x may satisfy $0.5 \leq x \leq 0.9$.

The first main component may be represented by $SrTiO_3$, where $SrTiO_3$ may be a paraelectric material having a relatively low curie temperature (Tc).

In addition, the second main component may be represented by $BiMO_3$, where M may include Mg and Ti.

M may be represented by $Mg_{0.5}Ti_{0.5}$. Therefore, the second main component may be represented by $Bi(Mg_{0.5}Ti_{0.5})O_3$.

$Bi(Mg_{0.5}Ti_{0.5})O_3$ may be a ferroelectric material having a relatively high curie temperature (Tc).

That is, the base powder of the dielectric ceramic composition according to the embodiment of the present disclosure may be formed by mixing the paraelectric material having a relatively low curie temperature and the ferroelectric material having a relatively high curie temperature at a certain ratio.

The base powder may be manufactured by mixing the paraelectric material and the ferroelectric material at a certain ratio as described above, thereby achieving high permittivity at room temperature and superior dc-bias characteristics.

The dielectric ceramic composition according to the embodiment of the present disclosure may have a permittivity of 1000 or more at room temperature.

In addition, the base powder of the dielectric ceramic composition may be formed by dissolving the paraelectric material and the ferroelectric material other than the mixture of the paraelectric material and the ferroelectric material.

In the case in which the base powder is formed of a solid solution of the paraelectric material and the ferroelectric material, the base powder may be a single phase and may be superior in terms of permittivity, dc-bias characteristics, a temperature coefficient of capacitance (TCC), a dissipation factor (DF), and the like, as compared to the mixture of the two materials.

The base powder may be represented by $xSrTiO_3$-$(1-x)BiMO_3$, and may have high permittivity at room temperature and superior dc-bias characteristics by adjusting x to satisfy $0.5 \leq x \leq 0.9$.

That is, the base powder may obtain the above-mentioned characteristics by containing $SrTiO_3$, which is the paraelectric material having a relatively low curie temperature (Tc), in an amount of 0.5 mol to 0.9 mol.

In the case in which x is below 0.5, the room temperature permittivity may be reduced and the dissipation factor (DF) may be increased.

Meanwhile, in the case in which x exceeds 0.9, the room temperature permittivity may be reduced and the dc-bias characteristics may be deteriorated.

The base powder is not particularly limited, but may have an average particle diameter of 1000 nm or less.

b) First Sub-Component

According to the embodiment of the present disclosure, the dielectric ceramic composition may further include an oxide or a carbonate containing at least one of Mn, V, Cr, Fe, Ni, Co, Cu and Zn, as a first sub-component.

As the first sub-component, the oxide or the carbonate containing at least one of Mn, V, Cr, Fe, Ni, Co, Cu and Zn may be included at a content of 0.5 mol to 3.0 mol based on the base power of 100 mol.

The first sub-component may serve to decrease a sintering temperature and improve withstand voltage characteristics at high temperature, with respect to the multilayer ceramic capacitor to which the dielectric ceramic composition is applied.

The content of the first sub-component and a content of a second sub-component to be described below are defined as amounts of the first sub-component and the second sub-component included in the base powder of 100 mol, and particularly defined as the number of moles of metal ions contained in respective sub-components.

In the case in which the content of the first sub-component is below 0.5 mol, the sintering temperature may be increased and the high-temperature withstand voltage characteristics may be degraded.

In the case in which the content of the first sub-component exceeds 3.0 mol, the high-temperature withstand voltage characteristics and a room temperature specific resistance may be degraded.

Particularly, the dielectric ceramic composition according to the embodiment of the present disclosure may further include the first sub-component having the content of 0.5 mol to 3.0 mol, such that the sintering process may be performed at low temperature and superior high-temperature withstand voltage characteristics may be obtained.

c) Second Sub-Component

According to the embodiment of the present disclosure, the dielectric ceramic composition may include an oxide containing Si or a glass compound containing Si, as a second sub-component.

The dielectric ceramic composition may further include the second sub-component, the oxide containing Si or the glass compound containing Si, of 0.5 mol to 3.0 mol, based on the base powder of 100 mol.

As the second sub-component, the oxide containing Si or the glass compound containing Si may be included at a content of 0.5 mol to 3.0 mol based on the base powder of 100 mol.

The second sub-component may serve to decrease a sintering temperature and improve withstand voltage characteristics at high temperature, with respect to the multilayer ceramic capacitor to which the dielectric ceramic composition is applied.

In the case in which the content of the second sub-component is below 0.5 mol, the sintering temperature may be increased.

In the case in which the content of the second sub-component exceeds 3.0 mol, the high-temperature withstand voltage characteristics may be degraded.

The dielectric ceramic composition according to the embodiment of the present disclosure may further include the second sub-component having the content of 0.5 mol to 3.0 mol, such that the sintering process may be performed at low temperature and superior high-temperature withstand voltage characteristics may be obtained.

FIG. 1 is a graph showing changes in dielectric constant ($\in_r$) against a DC-bias according to an inventive example and a comparative example.

Referring to FIG. 1, it may be appreciated that when DC voltage is applied, a multilayer ceramic capacitor using a dielectric ceramic composition according to an inventive example has no change in permittivity as the DC voltage is increased from 0V to 10 V/μm.

On the other hand, it may be appreciated that in the case of a multilayer ceramic capacitor (sample 28 to be described below) using a ferroelectric material, a X5R dielectric material, according to a comparative example, permittivity is sharply decreased as the DC voltage is increased from 0V to 10 V/μm.

Therefore, the multilayer ceramic capacitor using the dielectric ceramic composition according to the embodiment of the present disclosure may be superior in terms of DC-bias characteristics, that is, have no change in permittivity when the DC electric field is applied, whereby high capacitance may be implemented without a reduction of capacitance.

Figure 2:
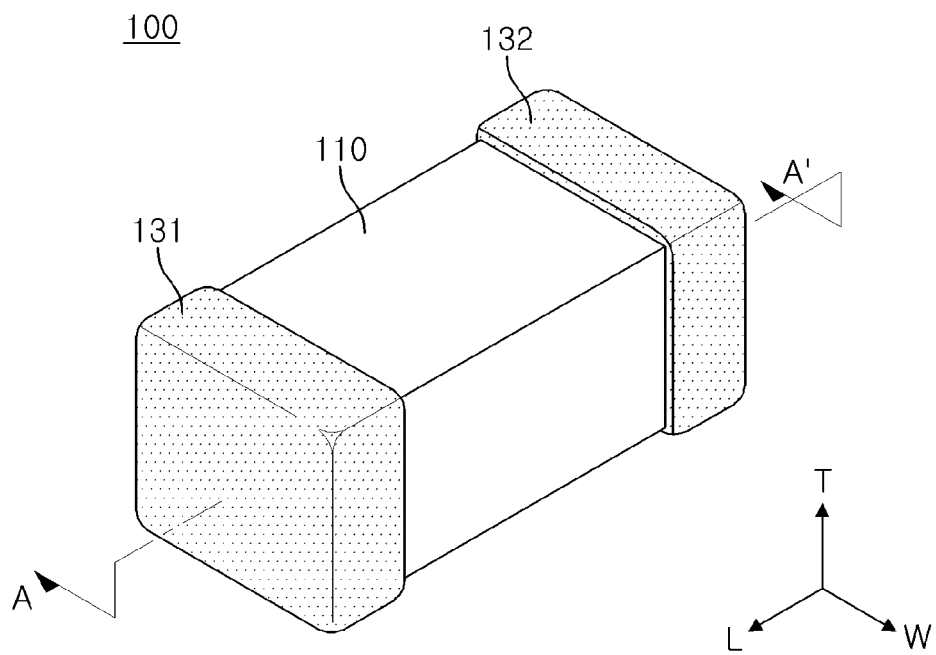
FIG. 2 is a schematic perspective view of a multilayer ceramic capacitor according to an embodiment of the present disclosure.
Figure 3:
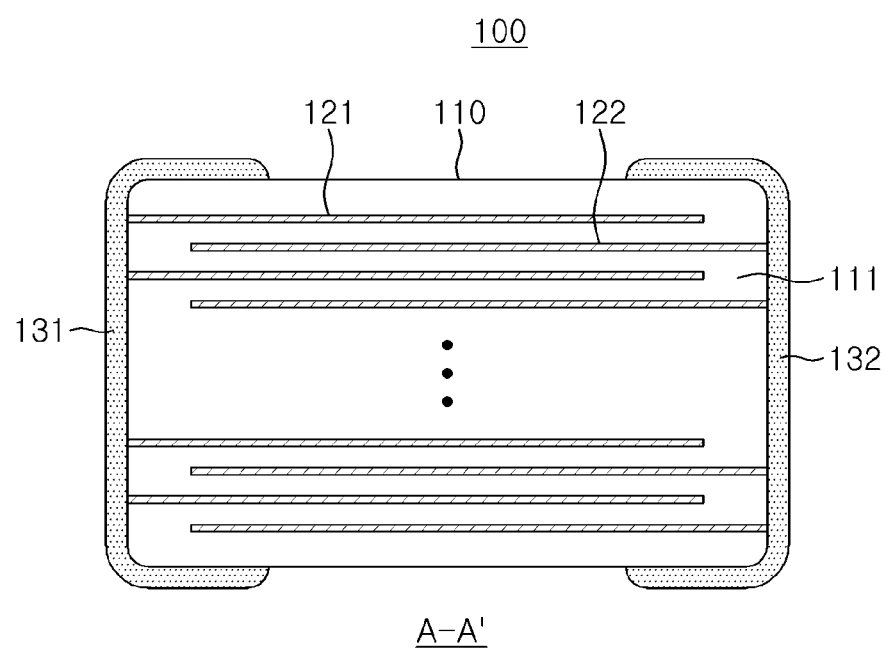
FIG. 3 is a schematic cross-sectional view of the multilayer ceramic capacitor, taken along line A-A' of FIG. 2.

FIG. 2 is a schematic perspective view of a multilayer ceramic capacitor according to an embodiment of the present disclosure, and FIG. 3 is a schematic cross-sectional view of the multilayer ceramic capacitor taken along line A-A' of FIG. 2.

Referring to FIGS. 2 and 3, a multilayer ceramic capacitor 100 according to another embodiment of the present disclosure may include a ceramic body 110 in which dielectric layers 111 and first and second internal electrodes 121 and 122 are alternately stacked. Both end portions of the ceramic body 110 may be provided with first and second external electrodes 131 and 132 electrically connected to the first and second internal electrodes 121 and 122 alternately disposed in the ceramic body 110.

The shape of the ceramic body 110 is not particularly limited, but the ceramic body 110 may have a rectangular parallelepiped shape. In addition, the dimension of the ceramic body 110 is not particularly limited. The ceramic body 110 may have an appropriate dimension according to a usage thereof, for example, may have (0.6 mm to 5.6 mm)×(0.3 mm to 5.0 mm)×(0.3 mm to 1.9 mm).

The thickness of the dielectric layer 111 may be selectively changed according to intended capacitance of the capacitor. According to an embodiment of the present disclosure, the thickness of a single dielectric layer may be 0.2 μm or more after sintering.

Extremely thin dielectric layers including a small number of grains existing in one layer have a bad effect on reliability, such that the dielectric layer may have a thickness of 0.2 μm or more.

The first and second internal electrodes 121 and 122 may be stacked while allowing ends thereof to be alternately exposed to opposing end surfaces of the ceramic body 110.

The first and second external electrodes 131 and 132 may be formed on both end portions of the ceramic body 110, and may be electrically connected to the exposed ends of the alternately disposed first and second internal electrodes 121 and 122, whereby a capacitor circuit is configured.

A conductive material contained in the first and second internal electrodes 121 and 122 is not particularly limited; however, precious metals may be used therefor, since the dielectric layer according to the embodiment of the present disclosure includes a mixture of or a solid solution of a paraelectric material and a ferroelectric material.

For example, the precious metals used as the conductive material may include palladium (Pd) or a palladium (Pd) alloy.

For example, the palladium (Pd) alloy may be an alloy of palladium (Pd) and at least one selected from a group consisting of manganese (Mn), chrome (Cr), cobalt (Co), and aluminum (Al), and a content of palladium (Pd) in the alloy may be 95 wt % or more.

For example, the precious metals used as the conductive material may include silver (Ag) or a silver (Ag) alloy.

The thickness of the first and second internal electrodes 121 and 122 may be appropriately determined according to use and the like, and is not particularly limited, but for example, may be 0.1 μm to 5 μm or 0.1 μm to 2.5 μm.

A conductive material included in the first and second external electrodes 131 and 132 is not particularly limited, but nickel (Ni), copper (Cu), or an alloy thereof may be used.

The thickness of the first and second external electrodes 131 and 132 may be appropriately determined according to use and the like, and is not particularly limited, but for example, may be 10 μm to 50 μm.

The dielectric layers 111 forming the ceramic body 110 may include a dielectric ceramic composition according to an embodiment of the present disclosure.

The dielectric ceramic composition according to the present embodiment may include a base powder represented by $xSrTiO_3$-$(1-x)BiMO_3$ (M includes Mg and Ti) containing a first main component represented by $SrTiO_3$ and a second main component represented by $BiMO_3$, where x may satisfy $0.5 \leq x \leq 0.9$.

The dielectric ceramic composition according to the present embodiment has the same characteristics as those of the dielectric ceramic composition according to the above-described embodiment. Therefore, a detailed description thereof will be omitted.

A multilayer ceramic capacitor 100 according to another embodiment of the present disclosure may include a ceramic body 110 in which dielectric layers 111 and first and second internal electrodes 121 and 122 are alternately stacked, and first and second external electrodes 131 and 132 formed on both end portions of the ceramic body 110 and electrically connected to the first and second internal electrodes 121 and 122. The dielectric layers 111 may include a dielectric ceramic composition having a permittivity of 1000 or more at room temperature and satisfying a rate of change in a dielectric constant ($\in_r$) of 10% or less when a DC electric field is changed from 0V to 5 V/μm.

According to the present embodiment, since the dielectric layer 111 includes the dielectric ceramic composition having the permittivity of 1000 or more at room temperature and satisfying the rate of change in a dielectric constant ($\in_r$) of 10% or less when the DC electric field is changed from 0V to 5 V/μm, it may have no change in permittivity when the DC electric field is applied thereto, whereby high capacitance may be implemented without a reduction of capacitance.

The dielectric ceramic composition may include a base powder represented by $xSrTiO_3$-$(1-x)BiMO_3$ (M includes Mg and Ti) containing a first main component represented by $SrTiO_3$ and a second main component represented by $BiMO_3$, where x may satisfy $0.5 \leq x \leq 0.9$.

Features other than the above-mentioned features are the same as those of the dielectric ceramic composition and the multilayer ceramic capacitor according to the above-described embodiment. Therefore, a description thereof will be omitted.

Hereinafter, although the present disclosure will be described in detail with reference to Inventive and Comparative Examples, the description should not be construed as being limited to the scope of the present disclosure, but is to help an understanding of the present disclosure.

A raw material powder included $xSrTiO_3$-$(1-x)Bi(Mg_{0.5}Ti_{0.5})O_3$ as a main component, and the powder was manufactured using a liquid phase precursor (LPP) method as follows.

Starting raw materials were $Sr(NO_3)H_2O$, $TiCl_3$, $Bi(NO_3)_5$ $H_2O$, and $Mg(NO_3)_2$, and they were dissolved in an aqueous solution to meet composition ratios described in the following Table 1.

The above-mentioned aqueous solutions were impregnated into a cellulose powder and calcined at a temperature of 700° C. to 900° C. in the air, thereby forming a raw material powder having an average particle size of 170 nm.

The raw material power was subjected to a ball milling for 20 hours using zirconium balls as mixing and dispersing media and mixed with ethanol and toluene, a dispersing agent and a binder, thereby manufacturing slurry.

The slurry was formed as sheets having a thickness of about 2.0 μm to 3.5 μm using a doctor blade coater.

Internal electrodes formed of palladium (Pd) and having a thickness of about 2.0 μm were printed on the respective sheets.

Sheets having a thickness of 10 μm to 13 μm were stacked in an amount of 25 layers to thereby form upper and lower cover layers, and the sheets having the internal electrodes having a thickness of about 2.0 μm printed thereon were stacked to thereby form an active layer, whereby a bar was manufactured.

The bar was compressed and cut into a chip having a 3216 size using a cutter.

The chip was plasticized and was then sintered for 2 hours at a temperature of 1150° C. to 1300° C. in an atmosphere.

The sintered chip was evaluated after a termination process was completed and then the chip was rested for 24 hours.

A multilayer ceramic capacitor according to a comparative example, corresponding to sample 28, was manufactured using the same conditions as those of multilayer ceramic capacitor according to the above-described inventive example, except that a dielectric layer was manufactured using a barium titanate ($BaTiO_3$) powder and an additive powder implementing X5R characteristics, internal electrodes were formed of nickel (Ni), and a sintering process was performed in a reducing atmosphere.

TABLE 1

| | Mol Ratio of Respective Components of Base Powder | | Number of Moles of Respective Sub-components based on Base Powder of 100 mol | |
|---|---|---|---|---|
| | First Main Component $SrTiO_3$ | Second Main Component $Bi(Mg_{0.5}Ti_{0.5})O_3$ | First Sub-component $MnO_2$ | Second Sub-component $SiO_2$ |
| *1 | 0.950 | 0.050 | 0.50 | 0.50 |
| 2 | 0.900 | 0.100 | 0.50 | 0.50 |
| 3 | 0.850 | 0.150 | 0.50 | 0.50 |
| 4 | 0.800 | 0.200 | 0.50 | 0.50 |
| 5 | 0.750 | 0.250 | 0.50 | 0.50 |
| 6 | 0.700 | 0.300 | 0.50 | 0.50 |
| 7 | 0.650 | 0.350 | 0.50 | 0.50 |
| 8 | 0.600 | 0.400 | 0.50 | 0.50 |

TABLE 1-continued

| | Mol Ratio of Respective Components of Base Powder | | Number of Moles of Respective Sub-components based on Base Powder of 100 mol | |
|---|---|---|---|---|
| | First Main Component $SrTiO_3$ | Second Main Component $Bi(Mg_{0.5}Ti_{0.5})O_3$ | First Sub-component $MnO_2$ | Second Sub-component $SiO_2$ |
| 9 | 0.550 | 0.450 | 0.50 | 0.50 |
| 10 | 0.500 | 0.500 | 0.50 | 0.50 |
| *11 | 0.450 | 0.550 | 0.50 | 0.50 |
| *12 | 0.400 | 0.600 | 0.50 | 0.50 |
| *13 | 0.350 | 0.650 | 0.50 | 0.50 |
| *14 | 0.300 | 0.400 | 0.50 | 0.50 |
| *15 | 0.250 | 0.750 | 0.50 | 0.50 |
| *16 | 0.650 | 0.350 | 0.00 | 0.00 |
| 17 | 0.650 | 0.350 | 0.50 | 0.00 |
| 18 | 0.650 | 0.350 | 1.00 | 0.00 |
| 19 | 0.650 | 0.350 | 2.00 | 0.00 |
| 20 | 0.650 | 0.350 | 3.00 | 0.00 |
| 21 | 0.650 | 0.350 | 0.00 | 0.50 |
| 22 | 0.650 | 0.350 | 0.00 | 1.00 |
| 23 | 0.650 | 0.350 | 0.00 | 2.00 |
| 24 | 0.650 | 0.350 | 0.00 | 3.00 |
| 25 | 0.650 | 0.350 | 1.00 | 1.00 |
| 26 | 0.650 | 0.350 | 2.00 | 2.00 |
| 27 | 0.650 | 0.350 | 3.00 | 3.00 |
| *28 | $100BaTiO_3$—$Y_2O_3$: 0.8, $MgCO_3$: 1.0, $BaCO_3$: 0.4, $SiO_2$: 1.25, $Al_2O_3$: 0.1, $MnO_2$: 0.05, $V_2O_5$: 0.05 | | | |

*Comparative Example

The following Table 2 shows a sintering temperature, permittivity at room temperature, a dissipation factor (DF), a change in permittivity against DC-bias, and high-temperature withstand voltage characteristics for each of inventive and comparative examples in Table 1.

The content of respective sub-components is represented by the number of moles based on the base powder of 100 mol, and the permittivity at room temperature and the dissipation factor (DF) refer to values calculated based on a capacitance value measured under conditions of 0.5 V/μm and 1 kHz using an LCR meter.

In addition, the change in permittivity against the DC-bias refers to a dielectric constant value measured under a condition of DC-bias of 8 V/μm.

In addition, the high-temperature withstanding electric field characteristics refer to a level of voltage per unit thickness (μm) sufficient to withstand insulation resistance of $10^5 \Omega$ or more, when measured while a voltage of 5 V/μm is applied for 10 minutes at 150° C. and is continuously increased.

TABLE 2

| Sample | Sintering Temperature (° C.) | Permittivity at Room Temperature | DF (%) | Permittivity at DC-bias (8 V/μm) | High-temperature Withstanding Electric Field (V/μm) |
|---|---|---|---|---|---|
| *1 | 1250.0 | 814.0 | 0.872 | 789.6 | 80 |
| 2 | 1250.0 | 1126.7 | 0.688 | 1070.4 | 80 |
| 3 | 1250.0 | 1153.7 | 0.586 | 1096.0 | 80 |
| 4 | 1250.0 | 1052.0 | 0.420 | 1001.2 | 75 |
| 5 | 1250.0 | 1120.2 | 0.433 | 1080.4 | 75 |
| 6 | 1250.0 | 1123.5 | 0.553 | 1078.5 | 75 |
| 7 | 1250.0 | 1134.1 | 0.770 | 1077.4 | 75 |
| 8 | 1250.0 | 1253.4 | 1.567 | 1077.9 | 75 |
| 9 | 1250.0 | 1020.0 | 2.430 | 971.8 | 70 |
| 10 | 1250.0 | 1048.0 | 3.020 | 989.4 | 70 |
| *11 | 1250.0 | 878.6 | 6.664 | 664.3 | 60 |
| *12 | 1250.0 | 992.2 | 7.475 | 694.5 | 60 |
| *13 | 1250.0 | 866.1 | 8.426 | 519.7 | 55 |
| *14 | 1250.0 | 571.8 | 9.567 | 257.3 | 55 |
| *15 | 1250.0 | 879.6 | 9.637 | 351.8 | 50 |
| *16 | 1300.0 | 1167.4 | 0.770 | 1109.0 | 60 |
| 17 | 1280.0 | 1128.5 | 0.750 | 1072.1 | 75 |
| 18 | 1250.0 | 1123.4 | 0.740 | 1067.2 | 80 |
| 19 | 1250.0 | 1120.2 | 0.640 | 1064.2 | 80 |
| 20 | 1250.0 | 1118.4 | 0.520 | 1062.5 | 75 |
| 21 | 1250.0 | 1166.9 | 0.710 | 1108.6 | 60 |
| 22 | 1230.0 | 1164.2 | 0.700 | 1106.0 | 60 |
| 23 | 1230.0 | 1153.7 | 0.680 | 1096.0 | 55 |
| 24 | 1230.0 | 1149.5 | 0.690 | 1092.0 | 50 |
| 25 | 1200.0 | 1130.4 | 0.650 | 1073.9 | 80 |
| 26 | 1200.0 | 1128.8 | 0.640 | 1072.4 | 80 |
| 27 | 1200.0 | 1126.7 | 0.520 | 1070.4 | 70 |
| *28 | 1200.0 | 4352.0 | 5.64 | 957.4 | 60 |

*Comparative Example

Referring to Table 2, in sample 1, a comparative example, in which a molar ratio of the first main component in the base powder exceeded 0.90, it may be appreciated that the permittivity at room temperature is low and the DC-bias characteristics is degraded.

In samples 11 to 15, comparative examples, in which a molar ratio of the first main component in the base powder was below 0.50, it may be appreciated that the permittivity at room temperature is low and the dissipation factor (DF) is high.

In sample 16, a comparative example, the molar ratio of the first main component and the second main component in the base powder satisfied a numerical range of the inventive concept to thereby be superior in terms of the permittivity at room temperature, the dissipation factor (DF) and the DC-bias characteristics; however, the first and second sub-components were not added thereto and the content thereof was out of a numerical range of the inventive concept, whereby the sintering temperature was increased.

Meanwhile, in sample 28, a comparative example, corresponding to a nickel-based multilayer ceramic capacitor using dielectrics implementing the X5R characteristics, rather than using the dielectric ceramic composition according to the inventive example, it may be appreciated that the permittivity at room temperature is high, but the DC-bias characteristics are degraded.

On the other hand, in samples 2 to 10 and 17 to 27, inventive examples, in which a molar ratio of the first main component and the second main component in the base powder satisfied a numerical range of the inventive concept and the content of the first sub-component and the second sub-component also satisfied a numerical range of the inventive concept, it may be appreciated that all of the permittivity at room temperature, it may be appreciated that the dissipation factor, the DC-bias characteristics, and the high-temperature withstand voltage characteristics are excellent and the sintering temperature is also low.

As set forth above, a dielectric ceramic composition according to embodiments of the present disclosure may secure a high permittivity of 1000 or more at room temperature.

In addition, a multilayer ceramic capacitor using a dielectric ceramic composition according to embodiments of the present disclosure is superior in terms of DC-bias characteristics, that is, has no change in permittivity when a DC electric field is applied, whereby high capacitance may be implemented without a reduction of capacitance.

While exemplary embodiments have been shown and described above, it will be apparent to those skilled in the art that modifications and variations could be made without departing from the spirit and scope of the present disclosure as defined by the appended claims.

What is claimed is:

1. A dielectric ceramic composition comprising a base powder represented by $xSrTiO_3$-$(1-x)BiMO_3$ (M includes Mg and Ti) containing a first main component represented by $SrTiO_3$ and a second main component represented by $BiMO_3$, wherein x satisfies $0.5 \leq x \leq 0.9$.

2. The dielectric ceramic composition of claim 1, wherein M is represented by $Mg_{0.5}Ti_{0.5}$.

3. The dielectric ceramic composition of claim 1, further comprising a first sub-component of 0.5 mol to 3.0 mol, based on the base powder of 100 mol, the first sub-component being an oxide or a carbonate containing at least one of Mn, V, Cr, Fe, Ni, Co, Cu and Zn.

4. The dielectric ceramic composition of claim 1, further comprising a second sub-component of 0.5 mol to 3.0 mol, based on the base powder of 100 mol, the second sub-component being an oxide containing Si or a glass compound containing Si.

5. The dielectric ceramic composition of claim 1, wherein the dielectric ceramic composition has a permittivity of 1000 or more at room temperature.

6. A multilayer ceramic capacitor, comprising:
a ceramic body in which dielectric layers and first and second internal electrodes are alternately stacked; and
first and second external electrodes formed on both end portions of the ceramic body and electrically connected to the first and second internal electrodes,
wherein the dielectric layers include a dielectric ceramic composition including a base powder represented by $xSrTiO_3$-$(1-x)BiMO_3$ (M includes Mg and Ti) containing a first main component represented by $SrTiO_3$ and a second main component represented by $BiMO_3$, and x satisfies $0.5 \leq x \leq 0.9$.

7. The multilayer ceramic capacitor of claim 6, wherein M is represented by $Mg_{0.5}Ti_{0.5}$.

8. The multilayer ceramic capacitor of claim 6, wherein the dielectric ceramic composition further includes a first sub-component of 0.5 mol to 3.0 mol, based on the base powder of 100 mol, the first sub-component being an oxide or a carbonate containing at least one of Mn, V, Cr, Fe, Ni, Co, Cu and Zn.

9. The multilayer ceramic capacitor of claim 6, wherein the dielectric ceramic composition further includes a second sub-component of 0.5 mol to 3.0 mol, based on the base powder of 100 mol, the second sub-component being an oxide containing Si or a glass compound containing Si.

10. The multilayer ceramic capacitor of claim 6, wherein the dielectric ceramic composition has a permittivity of 1000 or more at room temperature.

11. A multilayer ceramic capacitor, comprising:
a ceramic body in which dielectric layers and first and second internal electrodes are alternately stacked; and
first and second external electrodes formed on both end portions of the ceramic body and electrically connected to the first and second internal electrodes,
wherein the dielectric layers include a dielectric ceramic composition having a permittivity of 1000 or more at room temperature and satisfying a rate of change in dielectric constant ($\in_r$) of 10% or less when a DC electric field is changed from 0V to 5V/μm, and
the dielectric ceramic composition includes a base powder represented by $xSrTiO_3$-$(1-x)BiMO_3$ (M includes Mg and Ti) containing a first main component represented by $SrTiO_3$ and a second main component represented by $BiMO_3$ and x satisfies $0.5 \leq x \leq 0.9$.

12. The multilayer ceramic capacitor of claim 11, wherein M is represented by $Mg_{0.5}Ti_{0.5}$.

13. The multilayer ceramic capacitor of claim 11, wherein the dielectric ceramic composition further includes a first sub-component of 0.5 mol to 3.0 mol, based on the base powder of 100 mol, the first sub-component being an oxide or a carbonate containing at least one of Mn, V, Cr, Fe, Ni, Co, Cu and Zn.

14. The multilayer ceramic capacitor of claim 11, wherein the dielectric ceramic composition further includes a second sub-component of 0.5 mol to 3.0 mol, based on the base powder of 100 mol, the second sub-component being an oxide containing Si or a glass compound containing Si.

15. The multilayer ceramic capacitor of claim 11, wherein the first and second internal electrodes include palladium (Pd) or a palladium (Pd) alloy.

\* \* \* \* \*